United States Patent [19]

Coleman

[11] Patent Number: 4,751,729
[45] Date of Patent: Jun. 14, 1988

[54] RING CODE RECORDER

[75] Inventor: Alan L. Coleman, East St. Kilda, Australia

[73] Assignee: George L. Andrews, New South Wales, Australia; a part interest

[21] Appl. No.: 44,548

[22] Filed: May 1, 1987

[30] Foreign Application Priority Data

May 1, 1986 [AU] Australia ............................. PH5697

[51] Int. Cl.$^4$ ........................ H04M 1/57; H04M 1/64
[52] U.S. Cl. .................................... 379/376; 379/386
[58] Field of Search ............................... 379/376, 386; 340/825.44; 379/82, 130, 140, 375, 373

[56] References Cited

U.S. PATENT DOCUMENTS 4,529,845 7/1985 Boeckmann ........................ 379/376

Primary Examiner—Stafford D. Schreyer
Attorney, Agent, or Firm—William E. Mouzavires

[57] ABSTRACT

A telephone accessory for detecting and recording and optionally displaying the number of rings sounded by a telephone which is ringing is disclosed. The accessory includes detecting means to detect the sound of the rings of the telephone, counting means associated with the detecting means to count the number of rings sounded by the telephone; recording/storage means associated with the counting means to record/store the number of rings counted; and optionally display means associated with the recording/storing means to display the number of rings recorded/stored.

A telephone accessory according to the invention can be a relatively inexpensive electronic circuit which does not include tape drives. The accessory can indicate that a particular caller has called without the telephone receiver being disengaged and in these circumstances a call by the caller does not cost anything. The telephone accessory also has a number of other advantages over telephone answering machines namely that a caller does not have to listen to a prerecorded message or leave a verbal message in order to indicate that he or she has made a telephone call.

21 Claims, 7 Drawing Sheets

FIRST RING TRIGGERS (TRAILING EDGE),
THE SECOND RING IS GATED THROUGH BY PULSE.

FIG. 8C

LATCHING CIRCUIT AND DISPLAY

FIG. 9

RING CODE RECORDER

This invention relates to a telephone accessory for detecting and recording the number of rings sounded by a telephone.

Telephone answering machines typically operate by playing a pre-recorded message after a preselected number of telephone rings and tape recording a message from the caller at the end of the pre-recorded message. These machines are relatively expensive since they usually incorporate two tape drives one of which drives an endless loop cassette tape having the pre-recorded message and the other one drives the tape which records the caller's message. In addition, there is a tendency by callers to resist leaving messages on telephone answering machines.

It is an object of this invention to provide a telephone accessory which ameliorates the above disadvantages.

Accordingly, in a broad form this invention provides a telephone accessory for detecting and recording and the optionally displaying of the number of rings sounded by a telephone, which accessory comprises:

detecting means to detect the sound of the rings of a ringing telephone;

counting means associated therewith to count the number of rings sounded by the telephone;

recording/storage means associated with the counting means to record/store the number of rings counted; and optionally display means associated with the recording/storage means to display the number of rings recorded/stored.

In one preferred form the telephone accessory further includes priming means operatively associated with detecting means and counting means to permit the accessory to count a second preselected number of rings after a first preselected number of rings. Preferably the first and second preselected numbers are from 1 to 15 and preferably the accessory allows for five to eight codes each of which code corresponds to a different second preselected number. An advantage of this form of the invention is that the caller can call more than the first preselected number of rings and if the phone is unanswered the caller could hang up, re-dial and allow the telephone to ring a second preselected number of rings which is recorded and optionally displayed. The detecting means can be a sound, vibration, reverberation, electrical pulse or electrical impulse sensor associated with a switch to activate the telephone accessory on detection of a telephone ring. Optionally the sensor has a pitch/loudness control to reject extraneous noise.

In an alternative preferred embodiment the counting means can have a timer operatively associated therewith which on activation by the sensor activates the telephone accessory for a preselected period and counts the number of rings. When the number of rings exceed a first preselected number they are rejected and/or cancelled by reset means operatively associated with the counting means and the recording/storage means or in an alternative configuration the timer activates the counter for a second preselected period at a selected time after the lapse of the first preselected period. In one preferred form the preselected first period is from 10 seconds to 5 minutes and after a lapse of from 1 second to 2 minutes the preselected second period is from 5 to 120 seconds.

In another preferred form the preselected first period is for 6 seconds to recognize ring sequence and a further six seconds to recognize the end of the rings and then about 30 seconds in which to record the number of rings.

Alternatively a gate can be arranged in circuit with a counter so as to reset counter after ringing has stopped for 3 seconds or 6 seconds, for example, if there were less than 8 rings, for example. The counter will only be reset then if 27 seconds or 30 seconds, for example, have elapsed since last ring. After the initial set of rings has stopped for 3 or 6 seconds, counter is then enabled to count the next incoming rings. Then 27 seconds or 30 seconds after the last ring the value in the counter is latched to a display and the counter is reset. Preferably if 27 seconds or 30 seconds expires without code being given, the counter remains at default (zero).

The display means can be at least one liquid crystal display which shows the number of rings. In another configuration the display means is at least two different coloured lights each colour corresponding to a preselected number of rings. Optionally there is one LED per code (or preselected number) on the display board.

Optionally the telephone accessory has a reset button which is preferably manually resettable and which is associated with reset means operatively associated with the recording/storage means which the receiver uses to cancel/reset the recorded and/or displayed number and a battery indicator which displays the level of charge or a power warning light which flashes when indicating low level of charge/power.

The telephone accessory can be designed to operate off a.c. mains power such as a.c. 240 volts (isolated from the telephone circuitry), a d.c. power supply such as a 12 volt transformer or a battery or it can be designed to tap into the telephone power supply.

In one preferred embodiment the telephone accessory is integrated into a telephone handset by using either separate indicators such as LEDS or illuminating existing buttons/dials. In another preferred form the accessory is incorporated in COMMANDER (trade mark) type systems which utilise memorised phone numbers and re-dial facilities.

Preferably the telephone accessory is associated with beeper equipment.

A telephone accessory according to the invention can be a relatively inexpensive electronic circuit which does not include tape drives. The accessory can indicate that a particular caller has called without the telephone receiver being disengaged and in these circumstances a call by the caller does not cost anything. The telephone accessory also has a number of other advantages over telephone answering machines namely that a caller does not have to listen to a prerecorded message or leave a verbal message in order to indicate that he or she has made a telephone call.

Preferred embodiments of the invention are illustrated in the accompanying figures in which.

Figure 1:
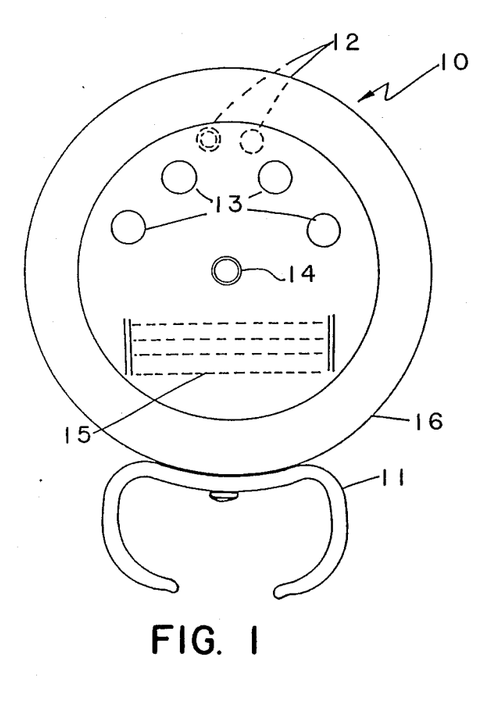
FIG. 1 is a telephone accessory which attaches to a telephone handset.

FIG. 1 shows the front of a telephone accessory 10 which attaches to a telephone handset by rotatable clip 11 which, for example, can be turned at 180° so as to face the front of the handset. In an alternative embodiment clip 11 can be mounted at the rear of accessory 10. In this embodiment battery test and tone adjustment controls 12 are located at the rear of accessory 10. Accessory 10 includes LED indicators 13 which when illuminated indicate specific preselected codes in accessory 10. A manually operable reset button 14 is located on the front of accessory 10. Also on the front of accessory 10 is an index 15 of code and phone numbers.

Accessory 10 is enclosed in a rubber or plastic mount 16 which not only protects accessory 10 but can also serve as a chin rest.

Figure 2:
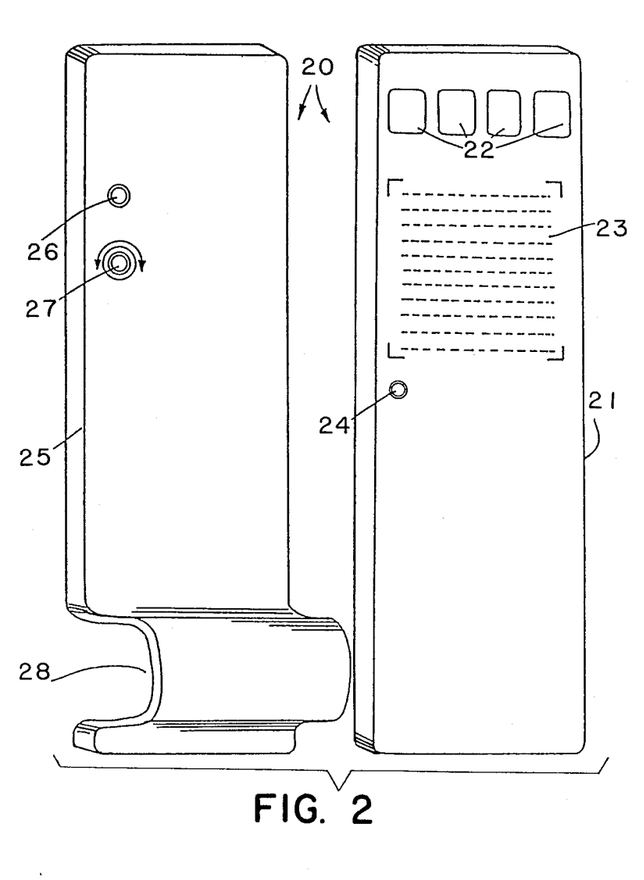
FIG. 2 is a telephone accessory having a recessed plastic end which fits into the cavity of a conventional telephone handset.
Figure 3:
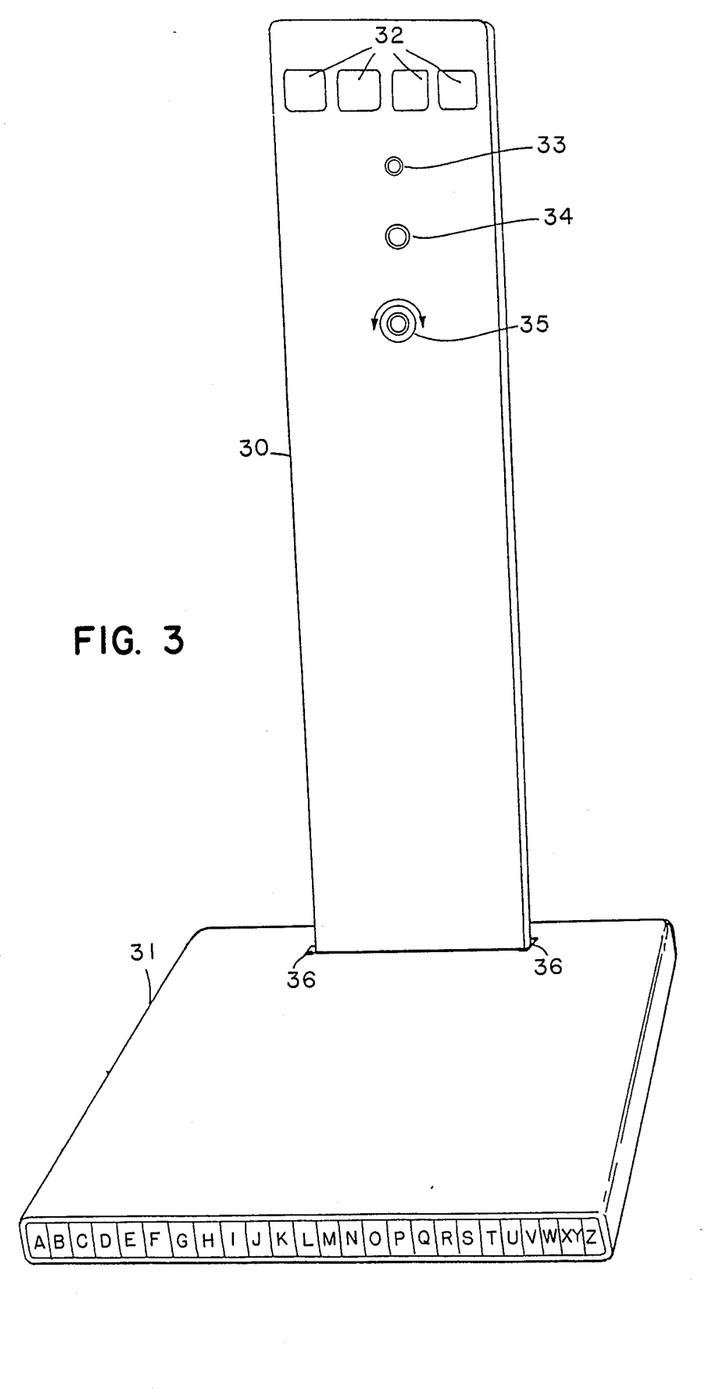
FIG. 3 is a telephone accessory mounted on a base which incorporates a teledex.

Referring to FIG. 2 the front back case of an alternative telephone accessory 20. Front case 21 includes liquid crystal displays 22 which can display a number from 1 to 9. Also included on front case 21 is an index of code and phone numbers 23 and a manually operable reset button 24. Back case 25 includes a battery test indicator 26 and a pitch control 27. Back case 25 also includes a recessed plastic portion which fits into the cavity at the rear of a conventional telephone handset. A further alternative embodiment of a front case of a telephone accessory 30 attached to a teledex 31 is shown in FIG. 3. Accessory 30 includes liquid crystal displays 32 which can display numbers from 1 to 9, a manually operable reset button 33, a battery test indicator 34 and pitch control 35. Accessory 30 preferably clips on to clips 36 which are mounted on baseplate 31.

Figure 4:
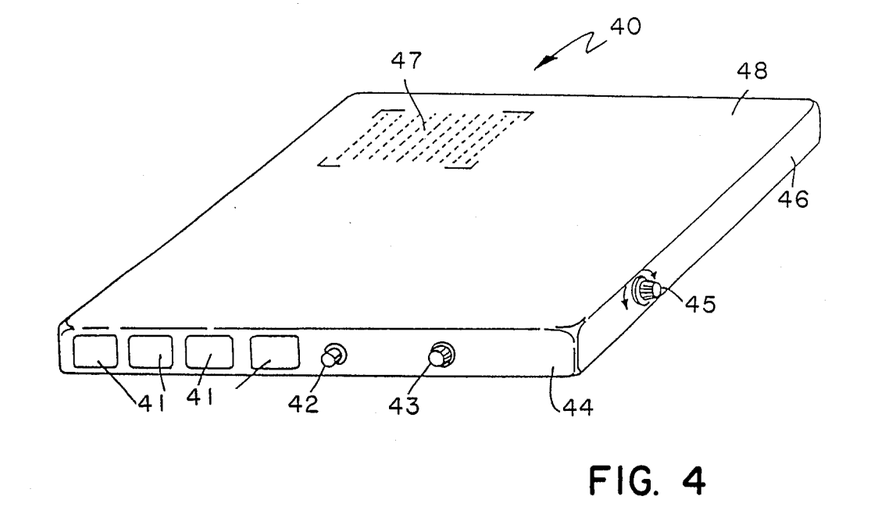
FIG. 4 is a telephone accessory which can be portable or be designed to form a base pad for a handset (an ancillary suction pad microphone can be used with the accessory)

FIG. 4 shows another embodiment of a case of a telephone accessory 40. Accessory 40 is rectangular prism in shape and includes liquid displays 41 which can display numbers from 1 to 9, a manually reset button 42 and battery indicator 43 at the front 44 of accessory 40. A pitch adjustment 45 is disposed on side 46 of accessory 40. Accessory 40 also includes an index of code and phone numbers 47 disposed on top 48 of accessory 40.

Figure 5:
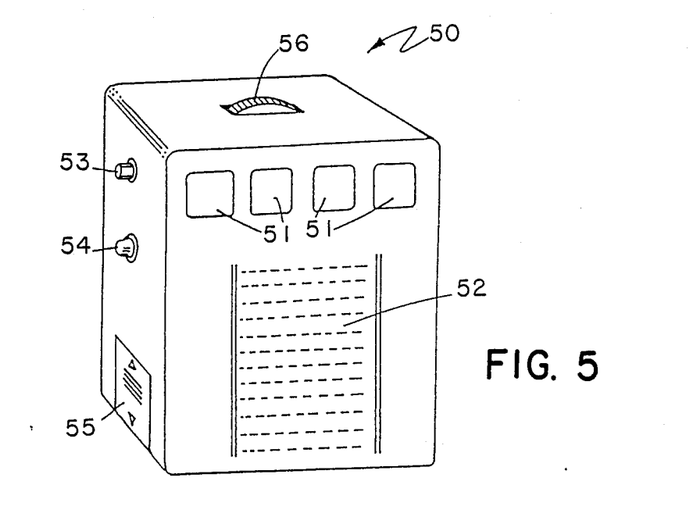
FIG. 5 is a beeper sized telephone accessory, freestanding and supplied with a mounting bracket for a wall phone.

In FIG. 5 an upright rectangular case of a telephone accessory 50 is depicted. Accessory 50 includes liquid crystal displays 51 which can display a number from 1 to 9 and an index of code and phone numbers 52 on one face of accessory 50. A manually resettable button 53, battery test indicator 54 and cover 55 through which a battery is inserted are disposed on one side of accessory 50. Pitch adjustment 56 is disposed on top of accessory 50.

Preferred embodiments of the invention will now be described by way of example.

Figure 6:
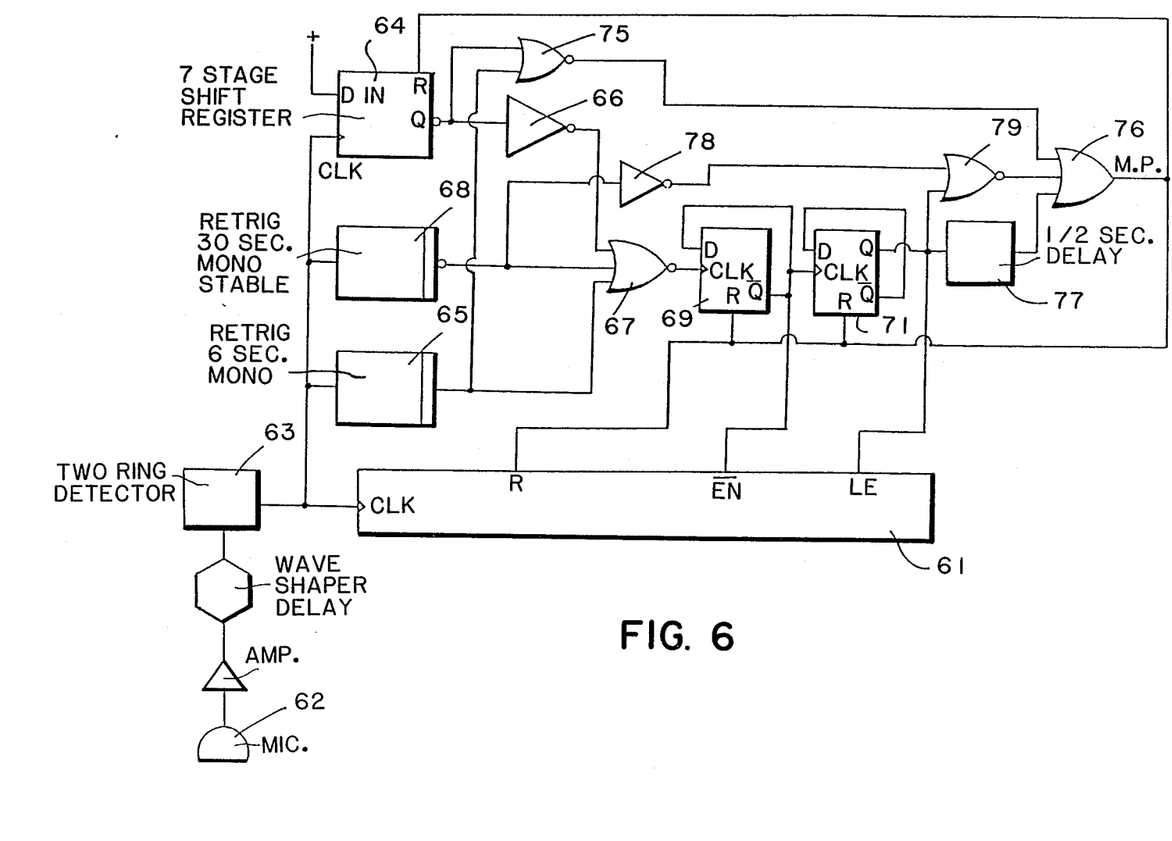
FIG. 6 is a preferred electrical circuit diagram of a telephone accessory for detecting and recording the number of rings sounded by a telephone.
Figure 7:
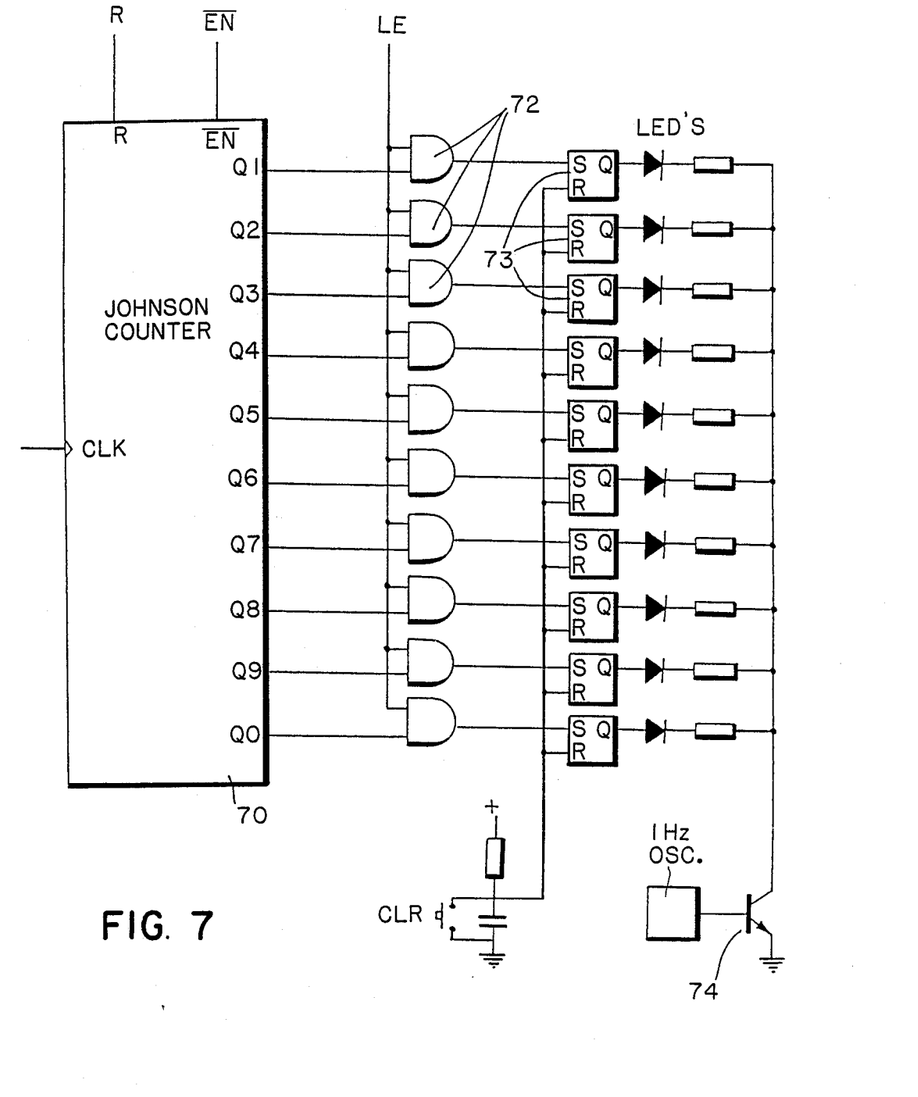
FIG. 7 is an electrical circuit diagram showing in detail the counter and display logic circuitry of the embodiment of FIG. 6.

A preferred form of electronic circuit for the telephone accessory is depicted in FIGS. 6 and 7, FIG. 7 revealing in more detail, the construction of the counter and display logic 61 of FIG. 6. The general function of the circuit is to detect ringing of a telephone either audibly, or electrically, and to provide through a visual display a record of the number of times the telephone has been permitted to ring during a single telephone call. The intention is to provide for the owner of the accessory information as to the caller's identity through a prearranged calling code, during the owner's absence from the telephone. For example, it may be prearranged with a regular caller that his identity corresponds to say three rings of the telephone, and this information is conveyed to the owner without cost to the caller.

To achieve such a record of the call, it is necessary for the caller to make a first telephone connection and permit the telephone to ring at least eight times before disconnection of the call. Within 30 seconds the caller will be required to telephone again and on this occasion to permit the telephone to ring the number of times corresponding to his prearranged identity code.

Referring to FIG. 6, a microphone 62 detects the ringing of a nearby telephone and its output is applied via an amplifier and wave shaper to a 2-ring detector 63. The purpose of the detector 63 is to provide a single output for each pair of rings received, as each telephone ring is in fact a dual tone. A 7-stage shift register 64 goes high at its Q7 output upon receipt of 7 outputs, after the initial telephone ring, from the detector 63 and while ringing outputs from detector 63 are occurring a 6-second monostable multivibrator 65 has its output high. After a lapse of 6 seconds from the cessation of ringing its output goes low and through inverter 66 the Q7 output of the register 64 is applied as a low to the input of the NOR gate 67. The output of a 30-second monostable multivibrator 68 is normally low and hence a high is applied at the output of gate 67 to clock on a first flip-flop 69 whose $\bar{Q}$ output goes high to energise the enable line $\overline{EN}$ of the Johnson counter 70 (FIG. 7).

When the caller again establishes the connection, ringing of the telephone will be applied to the CLK input of the Johnson counter 70 to place a high on the relative output Q thereof corresponding to the total number of rings detected, while simultaneously the output of the NOR gate 67 goes low. When ringing on this occasion has ceased, and after a duration of six seconds, the output of mono 65 goes low and the first flip-flop 69 is again clocked by a high output on the gate 67. Clocking of flip-flop 69 on this occasion causes clocking of a second flip-flop 71 whereby its Q output goes high and same is applied on the line LE to the series of AND gates 72 (FIG. 7) so that the respective gate 72 corresponding to the Q output of the Johnson counter 70 having at that time a high will close the respective one of the latches 73 to illuminate an LED which will be indicative of the ring count from the counter 70. All of the LED's are connected through individual resistors to a common earth line via a transistor 74 fed from a one Hz 50% duty cycle oscillator to effect flashing of the energised one or ones of the LED's. It will be appreciated that with repeated operations of the circuitry, more than one LED may be illuminated upon the return of the owner for identification of more than one caller during his absence. Resetting of the display will be effected by manual operation of a switch CLR at the option of the owner.

It will be seen that automatic resetting of the circuitry occurs under three circumstances. Firstly, if during the initial call less than eight rings are detected the Q7 output of the register 64 and the output of the 6-second mono 65 will be low and applied to NOR gate 75 whose high output will then reset the circuitry through the OR gate 76. Secondly, by delay circuit 77 a 0.5 second is permitted for operation of the latches 73 before resetting is effected through the gate 76. Thirdly, if eight or more rings have been detected to complete what may be called mode 1, and no second connection has been made to the telephone within 30 seconds, the output of the mono 68 goes high and via inverter 78 applies a low to one input of the NOR gate 79, which now receiving two low inputs goes high at its output to cause the gate 76 to reset the circuitry.

As ringing heard in the earpiece of a telephone does not necessarily exactly correspond to the ringing detected at the called telephone, any prearranged ringing code received may vary by one ring. Thus, a code of two rings at the calling telephone might be received as one, two or three rings. Similarly, a code of five rings could be received as four, five or six rings. It is intended that the circuit, therefore, recognises the rings in groups of three as a single code while users only rely upon codes spaced to allow the differences between sending and receiving signals. Preferably the circuit operates on codes of three, six, nine, twelve etc., or could alternatively be refined to work on codes of two, four, six, eight etc. It should now be clear that there are in fact two distinct calling modes, viz. Mode 1 which requires continuous ringing for at least eight rings, and mode 2 where a subsequent ringing code is transmitted within 30 seconds of mode 1. Hence, completion of mode 1 primes the circuit to await and record a prearranged ringing code.

Figure 8A:
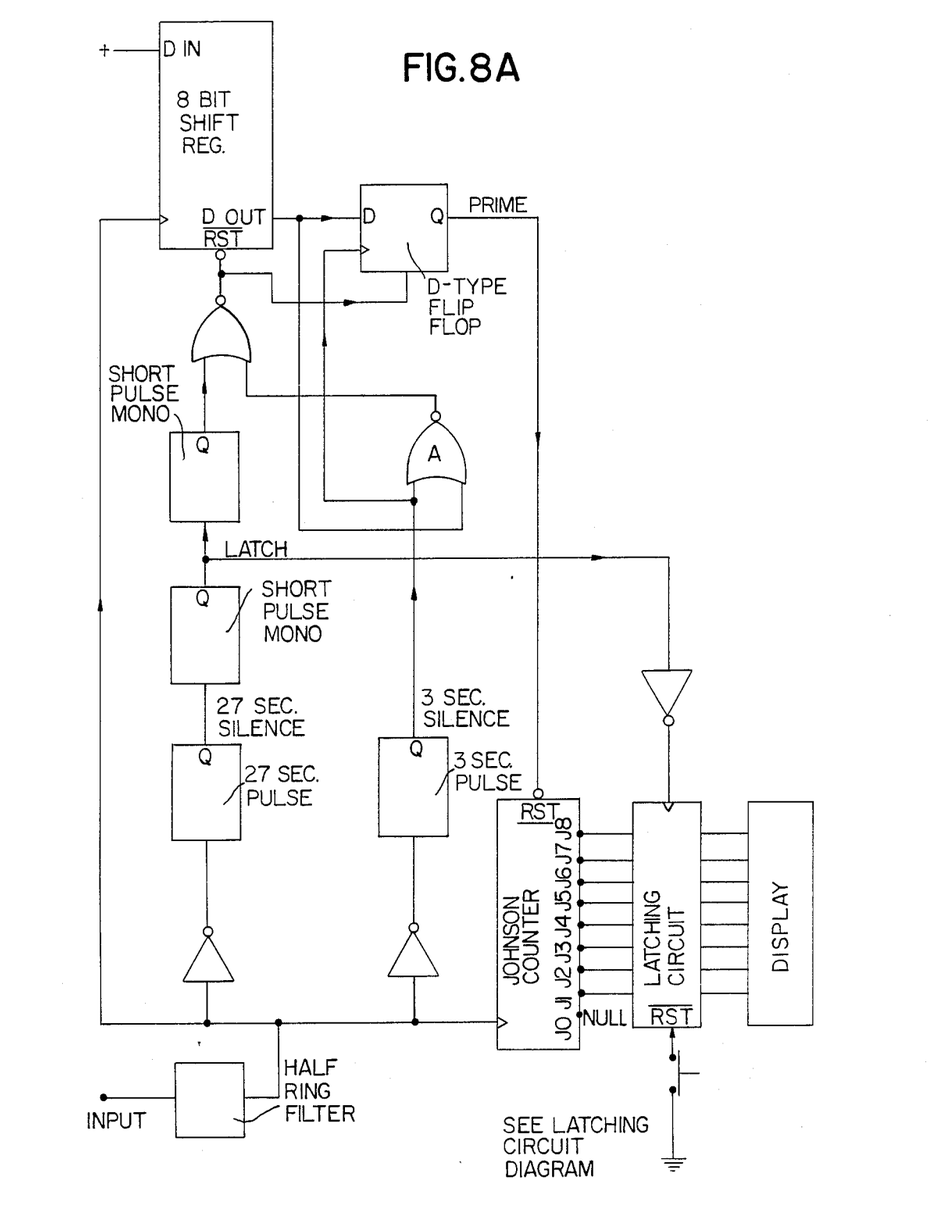
FIG. 8 is an alternative electrical circuit diagram of a telephone accessory for detecting and recording the number of rings sounded by a telephone and includes a separate detailed circuit diagram of a latching circuit and display; and, FIG. 9 is a wave form diagram relating to FIG. 6.
Figure 8B:
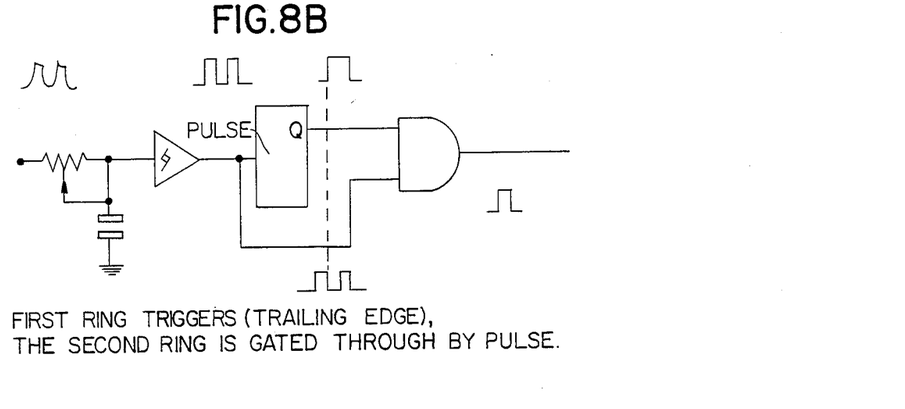
Figure 8C:
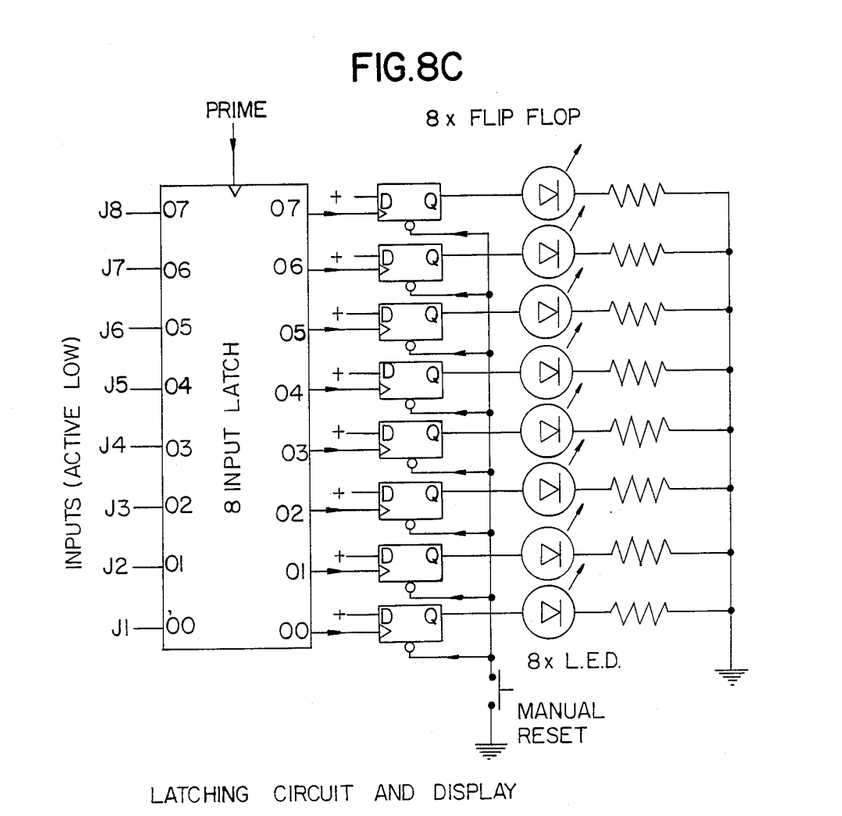
Figure 9:
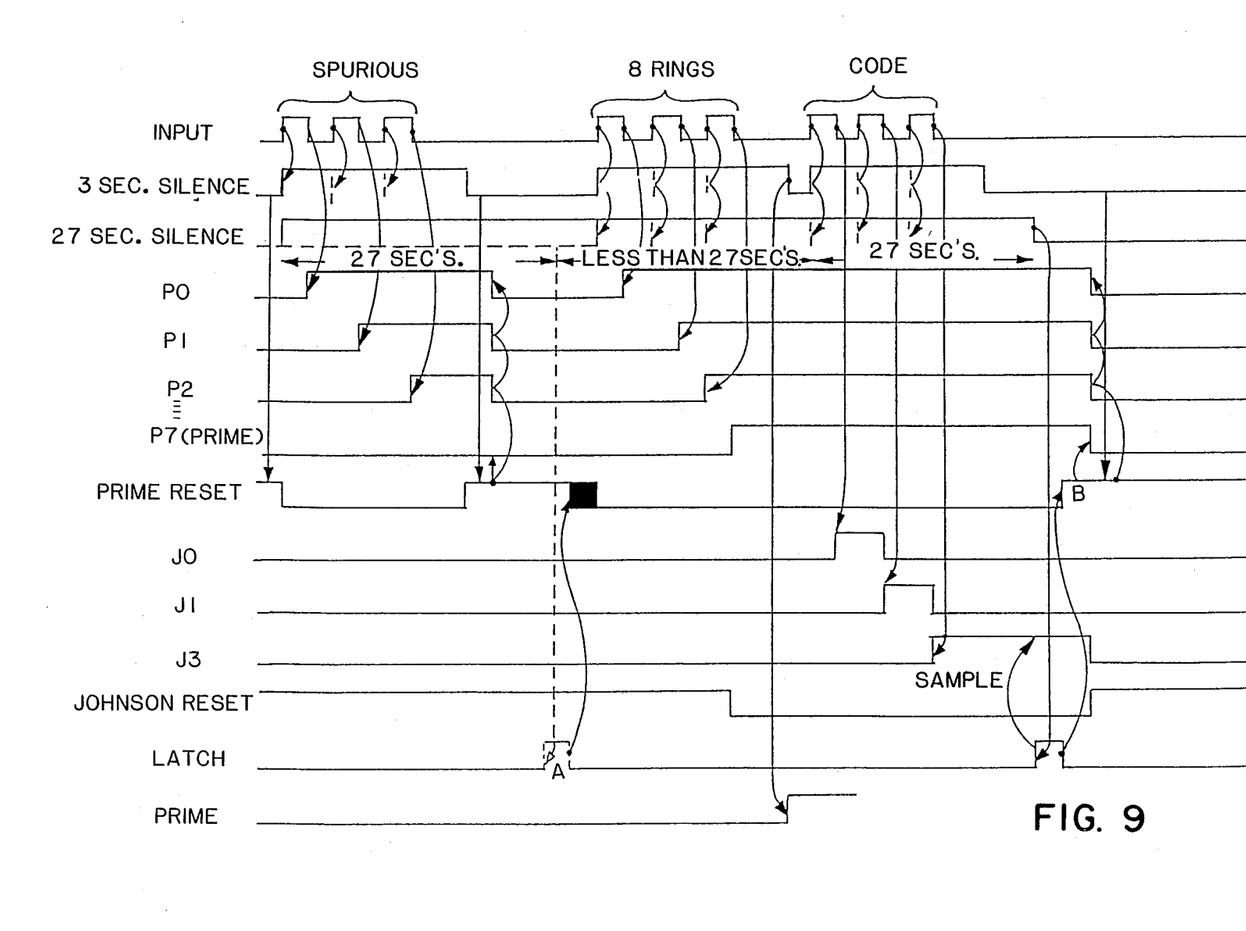

A modified form of electrical circuitry is shown in FIGS. 8 and 9 in which the time delays differ from the previous embodiment. In this instance a three second delay is provided for completion of mode 1, while 27 seconds is permitted for entering mode 2. Six seconds after the final ring is detected the count in the Johnson counter is latched to the display and the system reset. It should be understood that in all of the circuitry described above the monostable multivibrators are retriggerable, all lock inputs are positive edge triggered, and the circuitry is in a reset state whenever power is first applied.

What is claimed is:

1. A telephone accessory for detecting and recording the number of rings sounded by a telephone which is ringing, which accessory comprises:
   detecting means to detect the sound of the rings of said ringing telephone;
   counting means associated therewith to count the number of rings sounded by the telephone; and
   recording/storage means associated with the counting means to record/store the number of rings counted.

2. The accessory as defined in claim 1 further including priming means operatively associated with the detecting means and the counting means to permit the accessory to count a second preselected number of rings after a first preselected number of rings.

3. The accessory as defined in claim 2 further including display means operatively associated with the counting and/or recording/storage means to display the number of rings counted and recorded/stored.

4. The accessory as defined in claim 2 further including reset means operatively associated with the counting means, the recording/storage means and the display means to cancel the number of rings counted and recorded/stored and from being displayed when the number of rings is/are greater or less than said second preselected number or numbers.

5. The accessory as defined in claim 3 wherein the second preselected number or numbers is/are from 1 to 15 rings.

6. The accessory as defined in claim 1 further including reset means operatively associated with the counting means and the recording/storage means which cancels the number of rings counted and recorded/stored after a preselected first period, a timer operatively associated with the reset means, the counter means and the recording/storage means which timer is activated by the counter after the preselected first period for a selected time and wherein the number of telephone rings after said selected time and within a preselected second period following selected time are counted by the counter means and recorded/stored.

7. The accessory as defined in claim 6 further including display means operatively associated with said counting means and said recording/storage means to display the number of rings counted and recorded/stored during the preselected second period.

8. The accessory as defined in claim 7 further including second reset means operatively associated with the counting means, the timer means, the recording/storage means and the display means which cancels the number of rings counted and recorded/stored and from being displayed when the number of rings during the preselected second period is greater or less than a preselected number or numbers.

9. The accessory as defined in claim 8 wherein the preselected number or numbers during the preselected second period is/are from 1 to 15 rings.

10. The accessory as defined in claim 8 further including a third reset means which is optionally manually operable operatively associated with the counting means, recording/storage means and display means to cancel the number of rings counted, recorded/stored and displayed.

11. The accessory as defined in claim 6 wherein the preselected first period is from 10 seconds to 5 minutes, the selected time is from 1 second to 2 minutes and the preselected second period is from 5 seconds to 120 seconds.

12. The accessory as defined in claim 7 wherein the preselected first period is about 6 seconds, the selected time is about 6 seconds and the preselected second period is about 30 seconds.

13. The accessory as defined in claim 1 further including gate means operatively associated with the counting means and said recording/storage means to reset said counting means and said recording/storage means within a preselected silent period after said telephone has stopped ringing a first preselected number of rings or for a preselected first time period and wherein said gate means enables said counter means to count the number of telephone rings within a preselected counting and recording/storage period after said preselected silent period and to record/store said number of telephone rings in said recording/storage means.

14. The accessory as defined in claim 13 wherein said silent period is from 3 seconds to 26 seconds and said preselected counting and recording/storage period after said silent period is from about 4 seconds to about 60 seconds.

15. The accessory as defined in claim 13 wherein said silent period is from about 3 seconds to about 6 seconds and said preselected counting and recording/storage period after said silent period is from about 27 seconds to about 30 seconds.

16. The accessory as defined in claim 13 further including display means operatively associated with said counting means and said recording/storage means to display the number of rings counted and recorded/stored during said preselected counting and recording/storage period after said silent period.

17. The accessory as defined in claim 16 further including latching means associated with said counting means and said recording/storage means and said display means to latch said counted subsequent number of telephone rings in said display means and resetting means operatively associated with said counting means to reset said counting means after said latching of said counted subsequent number of telephone rings.

18. The accessory as defined in claim 17 further including a second resetting means operatively associated with said latching means, counting means, recording/storage means and display means to cancel the counted subsequent number of telephone rings recorded/stored and displayed when the counted subsequent number of telephone rings is/are greater or less than a second preselected number or numbers.

19. The accessory as defined in claim 18 wherein the first preselected number or numbers is/are from 1 to 15 rings.

20. The accessory as defined in claim 18 wherein the second preselected number or numbers is/are from 1 to 15 rings.

21. The accessory as defined in claim 19 wherein the second preselected number or numbers is/are from 1 to 15 rings.

* * * * *